Figure 1:
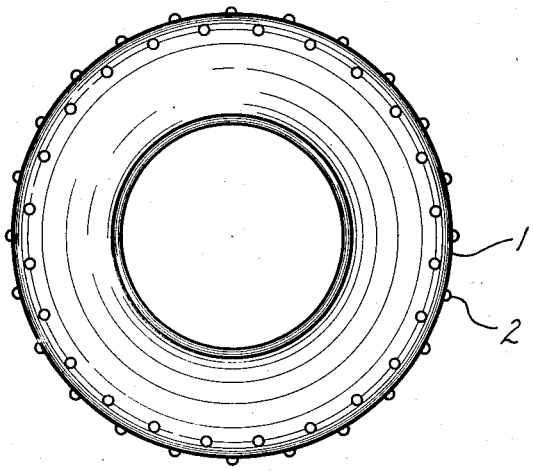

Oct. 30, 1951     T. W. DUNLAP     2,572,996

ABRASIVE INSERT FOR RUBBER TIRES

Filed Oct. 27, 1948

INVENTOR.
Thomas W Dunlap
BY William B. Jaspert
Attorney.

Patented Oct. 30, 1951

2,572,996

UNITED STATES PATENT OFFICE 2,572,996

ABRASIVE INSERT FOR RUBBER TIRES

Thomas W. Dunlap, Pittsburgh, Pa.

Application October 27, 1948, Serial No. 56,734

2 Claims. (Cl. 152—210)

This invention relates to new and useful improvements in antiskid rubber tires and it is among the objects thereof to provide rubber tires having abrasive elements embedded in the outer periphery thereof which, because of their hardness, will project beyond the face of the tire to engage the road surface and prevent skidding.

It is a further object of the invention to provide abrasive abutments, preferably of silicon carbide, which can be molded to shape suitable as inserts in rubber tires, as will be apparent from a consideration of the accompanying drawing, constituting a part hereof, and in which like reference characters designate like parts.

Figure 2:
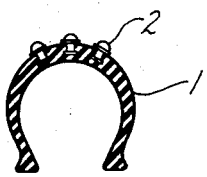
Figures 3, 4:
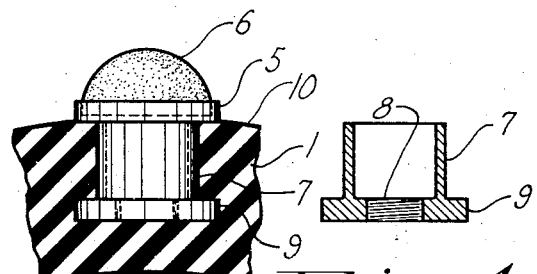
Figure 5:
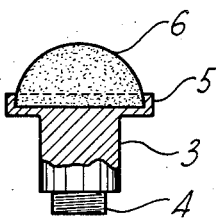
Figure 6:
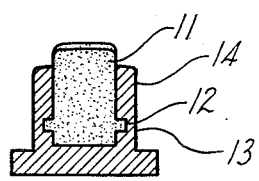
Figure 7:
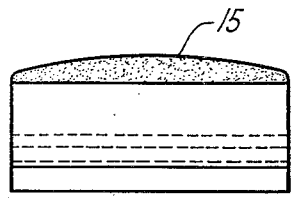

In the drawing Fig. 1 is a side elevational view of a rubber tire with abrasive inserts embodying the principles of this invention;

Fig. 2 a cross sectional view through the tire showing the abrasive elements in elevation;

Fig. 3 a cross sectional view, partially in elevation of a portion of a rubber tire with an abrasive insert;

Fig. 4 a vertical cross-sectional view of a ferrule for molding in the tire body;

Fig. 5 a cross sectional view, partially in elevation, of an abrasive insert mounted on a metal support;

Fig. 6 a cross sectional view of a modified form of abrasive insert and support; and Fig. 7 a side elevational view thereof.

In the drawing numeral 1 designates a rubber tire having abrasive inserts 2 mounted thereon, the inserts being preferably of button shape and secured in a stud 3 having a screw end 4 and having a flanged shoulder 5 which is bent inwardly as shown in Fig. 5 to hold the abrasive silicon carbide button 6. The stud 3 is adapted to be mounted in a ferrule 7 having a screw threaded portion 8 for receiving the thread 4. The ferrule 7 is provided with a lateral flange 9 which, when the ferrule is molded in the rubber, prevents displacement of the ferrule so that it will always maintain its proper position relative to the periphery or the outer surface 10 of the tire.

In the form of silicon carbide insert shown in Figs. 6 and 7, the silicon carbide is molded as a rectangular body 11 having tongues 12 that interact with grooves 13 of the metal retainer 14 which is embedded in the rubber tire similar to the embedding of the ferrule 7 as shown in Fig. 3. The silicon carbide material is premolded to the shape shown in Figs. 6 and 7 and has a curved outer surface 15 to prevent jarring of the insert when contacting the road surface.

Although several embodiments of the invention have been herein illustrated and described, it will be evident to those skilled in the art that various modifications may be made in the details of construction without departing from the principles herein set forth.

I claim:

1. In a rubber tire, abrasive structures for the tread of the tire comprising flanged ferrules having a threaded opening, said ferrules being embedded in the tread of the tire and a plug having a body-milled portion for engaging the wall of the ferrule and having a threaded portion for interacting with the thread of the ferrule, said plug having a flange portion for receiving abrasive material, a portion of the flange being crimped inward to intimately engage the abrasive material, said plug having a flange portion adapted to seat on the end of the ferrule.

2. An insert for rubber tires comprising the combination with a flanged ferrule having a threaded opening at the flange end and a cylindrical body portion, a mounting plug for the insert having a body-milled portion to fit the cylindrical portion of the ferrule and having a threaded end for interacting with the thread of the ferrule, the opposite end of the mounting piece being flanged to seat against the end of the ferrule when in threaded engagement therewith and constituting a seat for a silicon carbide insert shaped to fit in the flanged portion, said flange being crimped inwardly to interlock the silicon carbide insert therein.

THOMAS W. DUNLAP.

REFERENCES CITED

The following references are of record in the file of this patent:

UNITED STATES PATENTS

| Number | Name | Date |
|--------|------|------|
| 862,434 | Bartel | Aug. 6, 1907 |
| 929,193 | Cave-Browne-Cave | July 27, 1909 |
| 2,511,690 | Bergen | June 13, 1950 |

FOREIGN PATENTS

| Number | Country | Date |
|--------|---------|------|
| 2,861 | Great Britain | 1912 |